US012179320B2

(12) United States Patent
Lowrey

(10) Patent No.: US 12,179,320 B2
(45) Date of Patent: Dec. 31, 2024

(54) TENSION BOARD FOR STRAINING WIRE NETTING

(71) Applicant: WIREMAN PTY LIMITED, Milsons Point (AU)

(72) Inventor: Ian Lowrey, Surry Hills (AU)

(73) Assignee: Wireman Pty Limited (AU)

( * ) Notice: Subject to any disclaimer, the term of this patent is extended or adjusted under 35 U.S.C. 154(b) by 660 days.

(21) Appl. No.: 17/435,964

(22) PCT Filed: Mar. 3, 2020

(86) PCT No.: PCT/AU2020/050196
§ 371 (c)(1),
(2) Date: Sep. 2, 2021

(87) PCT Pub. No.: WO2020/176936
PCT Pub. Date: Sep. 10, 2020

(65) Prior Publication Data
US 2022/0096906 A1 Mar. 31, 2022

(30) Foreign Application Priority Data
Mar. 7, 2019 (AU) .................. 2019900745
Jul. 18, 2019 (AU) .................. 2019902537

(51) Int. Cl.
*B25B 25/00* (2006.01)
*E04H 17/02* (2006.01)
(Continued)

(52) U.S. Cl.
CPC ........... *B25B 25/00* (2013.01); *E04H 17/127* (2021.01); *E04H 17/266* (2013.01); *E04H 17/268* (2013.01); *F16G 11/12* (2013.01)

(58) Field of Classification Search
CPC ..... E04H 17/127; E04H 17/266; B25B 25/00; F16G 11/12
(Continued)

(56) References Cited

U.S. PATENT DOCUMENTS 355,135 A * 12/1886 Bunch
498,296 A  5/1893 Page
(Continued)

FOREIGN PATENT DOCUMENTS

AU 2017101598 B4 7/2019
WO 2018090079 A1 5/2018

OTHER PUBLICATIONS

Australian Patent Office, The International Search Report and The Written Opinion of the International Searching Authority, Apr. 28, 2020, for International Application No. PCT/AU2020/050196.

*Primary Examiner* — Dean J Kramer
(74) *Attorney, Agent, or Firm* — Design IP

(57) ABSTRACT

A tension board (30, 130) for straining net style fencing materials (42) composed of a first plurality of spaced apart substantially horizontal wires and a second plurality of spaced apart substantially vertical wires, is disclosed. The tension board takes the form of an elongate member having a longitudinal axis and a longitudinal extent at least corresponding to the distance between the first and last of the horizontal wires, and a plurality of wire grippers (10) connected to the elongate member at spaced apart locations. Each of the wire grippers (10) is configured to releasably grasp a corresponding one of the horizontal wires. This enables quick set up prior to straining and quick release once strained and tied off.

13 Claims, 8 Drawing Sheets

(51) Int. Cl.
*E04H 17/26* (2006.01)
*F16G 11/12* (2006.01)

(58) Field of Classification Search
USPC .......................... 294/132, 135, 136; 256/37
See application file for complete search history.

(56) References Cited

U.S. PATENT DOCUMENTS

| | | | |
|---|---|---|---|
| 545,255 A | | 8/1895 | Stauffer |
| 591,732 A | * | 10/1897 | Bohner |
| 606,420 A | * | 6/1898 | Kitselman |
| 740,130 A | * | 9/1903 | Hazard |
| 827,257 A | * | 7/1906 | Murrell |
| 911,963 A | | 2/1909 | Fisher |
| 1,031,115 A | * | 7/1912 | Hanson ................ B65H 54/585 |
| | | | 294/81.2 |
| 1,091,217 A | | 3/1914 | Hansen et al. |
| 1,099,318 A | | 6/1914 | Snedeker |
| 1,273,456 A | * | 7/1918 | Campbell ................ F16G 11/12 |
| | | | 254/231 |
| 2,158,927 A | * | 5/1939 | Davisson ................ F16G 11/12 |
| | | | 254/251 |
| 2,772,070 A | | 11/1956 | Stevenson |
| 2,782,003 A | * | 2/1957 | Wagoner ................ F16G 11/12 |
| | | | 254/223 |
| 3,146,993 A | * | 9/1964 | Kelsey ................ E04H 17/124 |
| | | | 294/132 |
| 4,190,234 A | | 2/1980 | Coleman |

\* cited by examiner

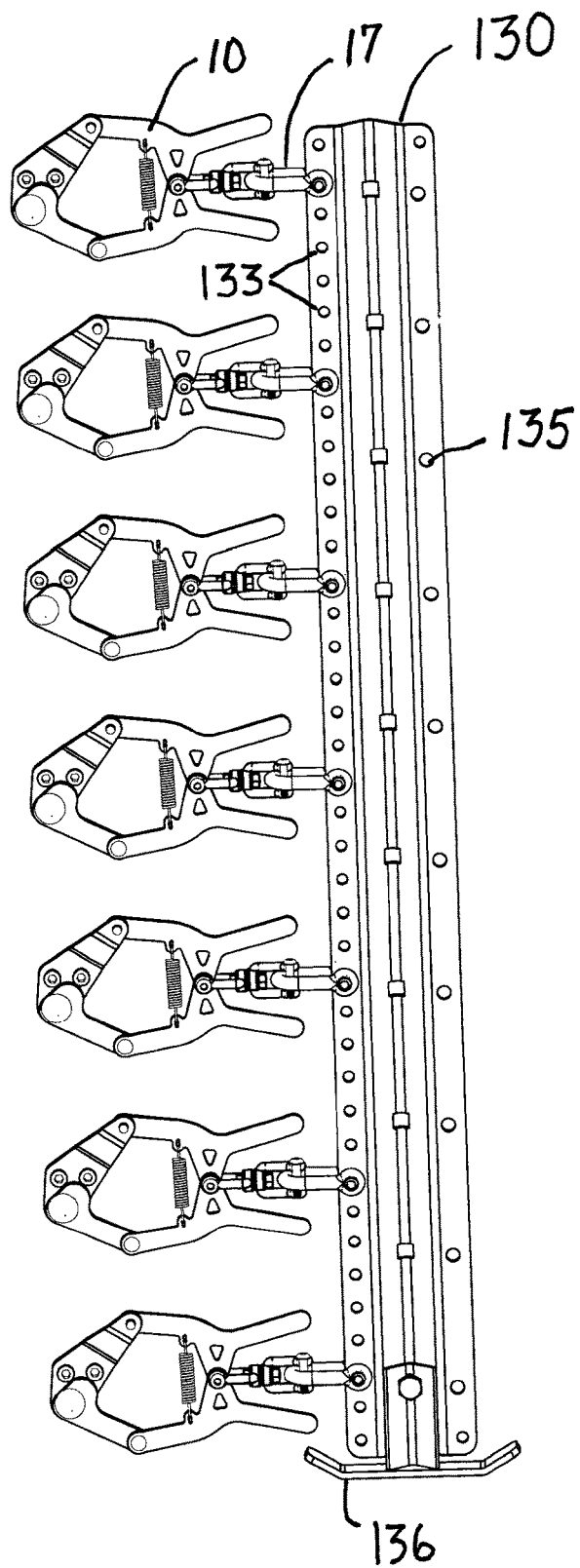
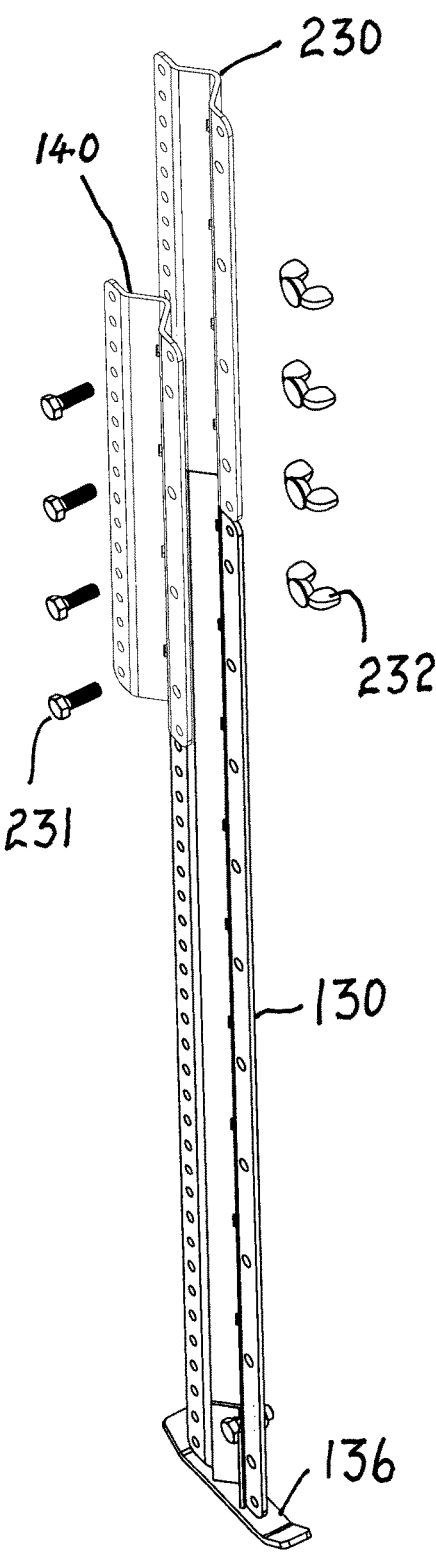
FIG. 5
FIG. 6

TENSION BOARD FOR STRAINING WIRE NETTING

FIELD OF THE INVENTION

The present invention relates to fencing and, in particular, to the straining of fences having net style fencing materials.

BACKGROUND ART

Net style fencing materials normally consist of woven or welded wires which are arranged so as to have a first plurality of spaced apart substantially horizontal wires and a second plurality of spaced apart substantially vertical wires. Normally the spacing between the vertical wires is the same, however, normally the distance between the horizontal wires decreases towards the lowermost horizontal wire. Such net style fencing materials are widely known under trade names such as Hinge Lock and Ring Lock. Traditionally the distance between the top and bottom horizontal wires was approximately waist high and thus substantially less than 2 meters.

However, this traditional material has recently been augmented with material for so-called exclusion fencing which has more horizontal wires and a distance between the top and bottom horizontal wire of approximately 2 meters.

Such net style fencing materials are sold in rolls. The material is unrolled along the fence line, tensioned and joined to the fence posts, or to tensioned wires which extend along the fence posts.

In order to tension the net style fencing materials, a tension board has hitherto been used to clamp the net material. The simplest type of tension board is two side by side wooden members which are interconnected with bolts. The net material is sandwiched between the two members, the bolts are inserted through the wooden members and net, and the bolts tightened, thereby clamping the net material between the two wooden members. The two wooden members are moved as one in order to tension the net material and simultaneously tension or strain all the horizontal wires of that net material.

A more sophisticated tension board is made from two steel members which are clamped together so as to grasp the net material. The clamping action is achieved by U-shaped projections on one member which pass through slots in the other member. Wedges are then driven through the U-shaped projections in order to clamp the two steel members together. Again the clamped members are moved as one in order to simultaneously tension the horizontal wires of the net material. An illustration of such a metal tension board is to be seen in Australian Patent Application No 2013 100 301 (AG Wholesalers).

Where two rolls of net material are to be simultaneously tensioned and joined, the end of each roll is clamped in a corresponding tension board and the two tension boards are drawn together, normally by means of two strainer devices each incorporating chains and a chain walking pawl arrangement.

GENESIS OF THE INVENTION

The genesis of the present invention is a desire to improve the operation of such tension boards.

SUMMARY OF THE INVENTION

In accordance with a first aspect of the present invention there is disclosed a tension board for straining net style fencing materials composed of a first plurality of spaced apart substantially horizontal wires and a second plurality of spaced apart substantially vertical wires, said board comprising an elongate member having a longitudinal axis and a longitudinal extent at least corresponding to the distance between the first and last of said horizontal wires, and a third plurality of wire grippers connected to said elongate member at spaced apart locations, each of said wire grippers being configured to releasably grasp one of said horizontal wires.

Preferably each of said wire grippers comprises a parallelogram arrangement comprising a pair of distal arms and a pair of proximal arms, the distal ends of the distal arms being pivoted to each other and shaped to form a wire clamp, each proximal end of the distal arms being pivoted to a corresponding distal end of the proximal arms, each proximal arm being pivoted together at the midpoint thereof, a spring interconnecting said proximal arms at a location intermediate said distal ends of said proximal arms and said midpoints, and urging said wire clamp closed, and said proximal arms extending beyond said midpoints in opposite directions to form a pair of graspable plier-like handles which when moved against the action of said spring opens said wire clamp. Such grippers are disclosed in International Patent Application No. PCT/AU2019/050939.

In accordance with a second aspect of the present invention there is disclosed a method of simultaneously straining the horizontal wires of net style fencing material composed of a first plurality of spaced apart substantially horizontal wires and a second plurality of spaced apart substantially vertical wires, said method comprising the steps of, in any order, grasping each of said substantially horizontal wires in a corresponding wire gripper at a corresponding location, connecting each of said wire grippers to a elongate member having a longitudinal axis and a longitudinal extent at least corresponding to the distance between the first and last of said horizontal wires, the spacing between each of said connected wire grippers corresponding to the spacing between said horizontal wires, and, thereafter, moving said elongate member so as to simultaneously increase the tension in said horizontal wires.

According to yet another aspect of the present invention there is provided a method of simultaneously straining the horizontal wires of two rolls of net style fencing material each composed of a first plurality of spaced apart substantially horizontal wires and a second plurality of spaced apart substantially vertical wires, said method comprising the steps of, in any order, for each said roll grasping each of said substantially horizontal wires in a corresponding wire gripper at a corresponding location, connecting each of said wire grippers of one said roll to a first elongate member having a longitudinal axis and a longitudinal extent at least corresponding to the distance between the first and last of said horizontal wires, the spacing between each of said connected wire grippers corresponding to the spacing between said horizontal wires, connecting each of said wire grippers of the other said roll to a second elongate member having a longitudinal axis and a longitudinal extent at least corresponding to the distance between the first and last of said horizontal wires, the spacing between each of said connected wire grippers corresponding to the spacing between said horizontal wires, and, thereafter, moving said first and second elongate members towards each other so as to simultaneously increase the tension in said horizontal wires of both rolls

BRIEF DESCRIPTION OF THE DRAWINGS

Two embodiments of the present invention will now be described, by way of example only, with reference to the accompanying drawings in which:

FIG. 5 is a side elevation of a tension board of a second embodiment, FIG. 6 is a perspective view illustrating the joining of two tension boards of the type illustrated in FIG. 5 to produce a single long board.

DETAILED DESCRIPTION

Figure 1:
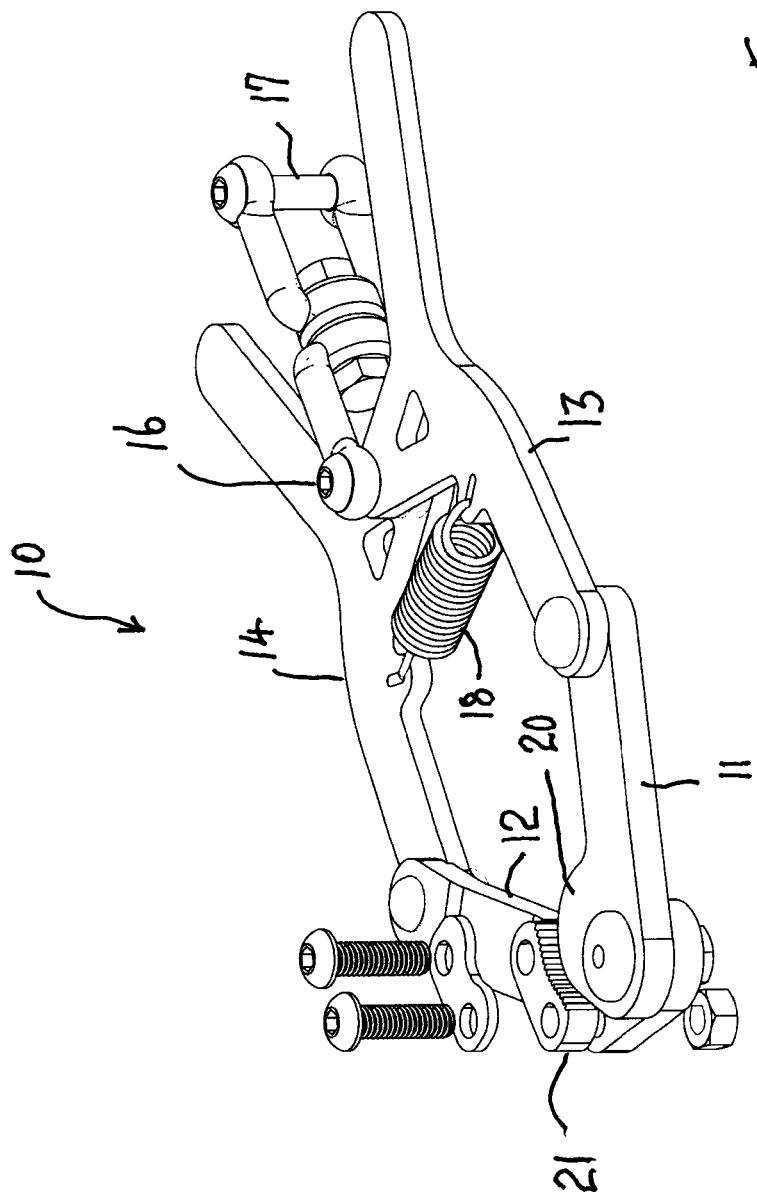
FIG. 1 is a partially exploded perspective view of a wire gripper of the general type as disclosed in International Patent Application No PCT/AU 2019/050939 with the wire clamping jaws closed.
Figure 2:
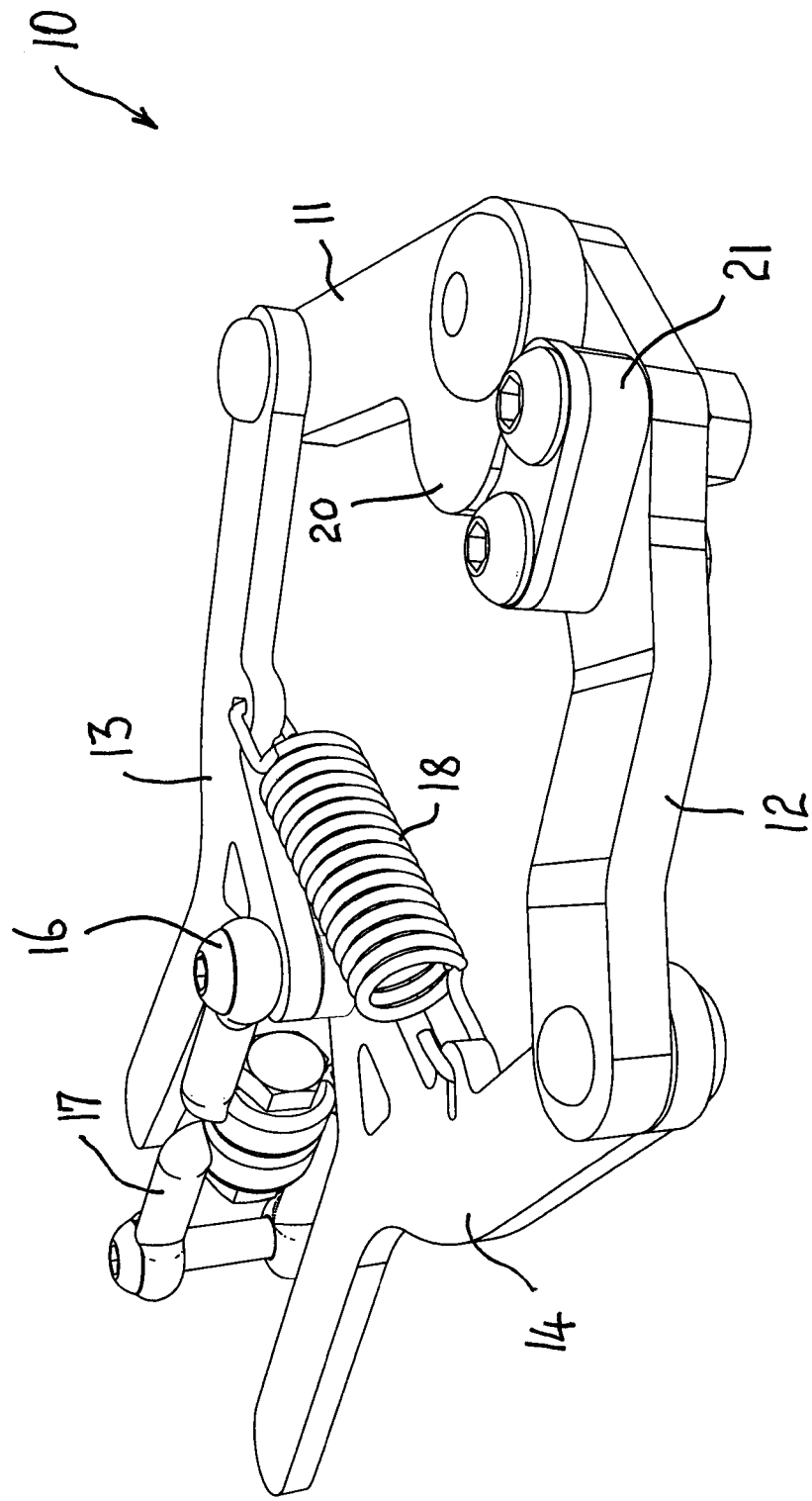
FIG. 2 is another perspective view of the wire gripper of FIG. 1 from its other side.

As seen in FIGS. 1 and 2, a wire gripper 10 is formed from a pair of distal arms 11, 12 and a pair of proximal arms 13, 14. The arm 11 is pivoted to the arm 13 and the arm 12 is pivoted to the arm 14. In addition, the arms 13 and 14 are pivoted together by means of a central pin 16 to which a pivotal connector 17 is located. In addition, the arms 13 and 14 are urged together by means of a spring 18.

The arm 11 is shaped to form an anvil 20 which engages with a serrated concave stop 21. By manipulating the handles 13, 14, so the anvil 20 can be moved towards, and away from, the concave stop 21. As best seen in FIG. 2, the arm 12 is kinked or cranked to allow the anvil 20 to align with the concave stop 21.

Figure 3:
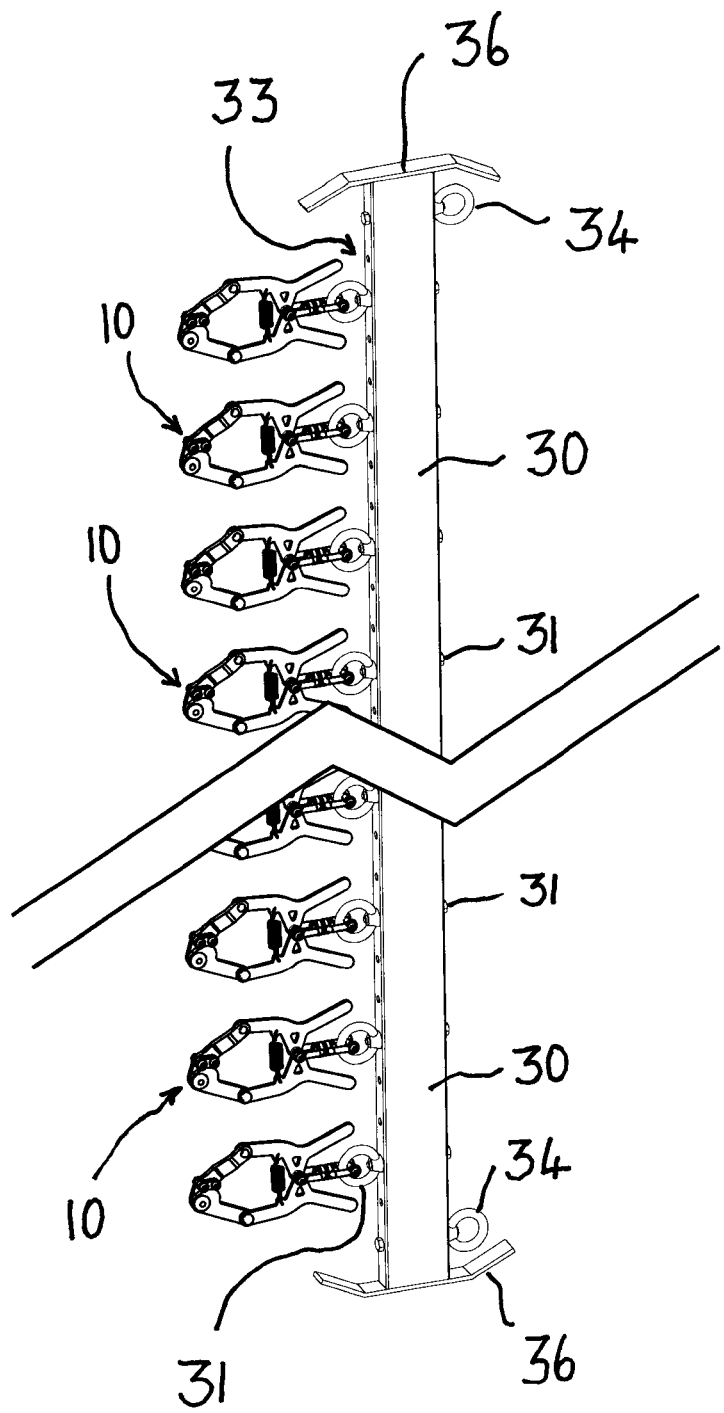
FIG. 3 is a truncated perspective view of a first embodiment of a tension board having a multiplicity of the wire grippers of FIGS. 1 and 2.

As seen in FIG. 3, a tension board 30 is provided with a multiplicity of wire grippers 10 such that each of the pivotal connectors 17 engages with the corresponding eye of a plurality of fasteners 31 each of which passes through the tension board 30. The tension board 30 is preferably provided with a multiplicity of through apertures 33 each of which is able to receive a fastener 31. In this way the spacing between the wire grippers 10 can be arranged to correspond to the spacing between the horizontal wires 41 of wire netting 42 as seen in FIG. 4.

Figure 4:
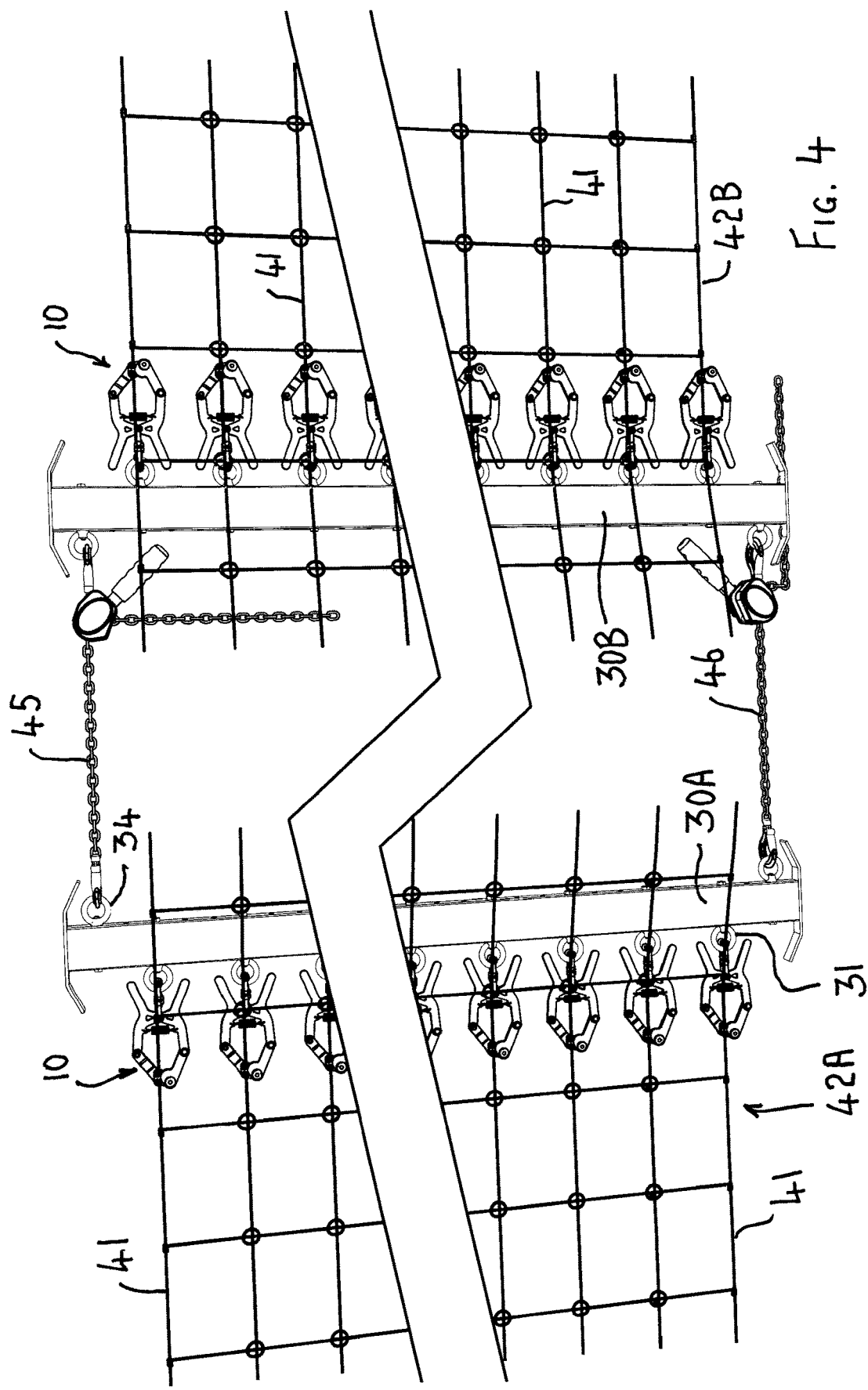
FIG. 4 is a truncated side view showing the simultaneous straining of two rolls of net style fencing material.

As seen in FIG. 4, a first tension board 30A has its wire grippers 10 directed to the left and each engaged with a corresponding horizontal wire 41 of a left hand roll of wire netting 42A. Similarly, a second tension board 30B has its wire grippers 10 directed to the right and each engaged with a corresponding horizontal wire 41 of a right hand roll of wire netting 42B. An upper wire strainer 45 extends between two upper eyebolts 34 at the upper end of the tension boards 30A, 30B. Similarly, a lower wire strainer 46 extends between two lower eyebolts 34 at the lower end of the tension boards 30A, 30B.

The tension boards 30A, 30B are preferably provided with skids 36 (FIG. 3) to facilitate the movement of the tension boards 30A, 30B towards each other. Normally the arrangement is such that the tension boards 30A, 30 B are moved together so as to tension the wire netting to the desired degree and permit the overlapped ends of the horizontal wires 41 to be joined by knotting, or by the use of joining devices such as GRIPPLEs (Registered Trade Mark).

It will be appreciated by those skilled in the art from the above description, that whereas the prior art tension boards actually clamp the wire netting, the tension boards 30A, 30B instead permit the force of the wire strainers 45, 46 to be transmitted to the wire clamping jaws of the wire grippers 10. Since each of the wire grippers 10 is able to be individually manipulated, the tension boards 30 can be quickly and easily applied to, and released from, the wire netting 42.

Figure 7:
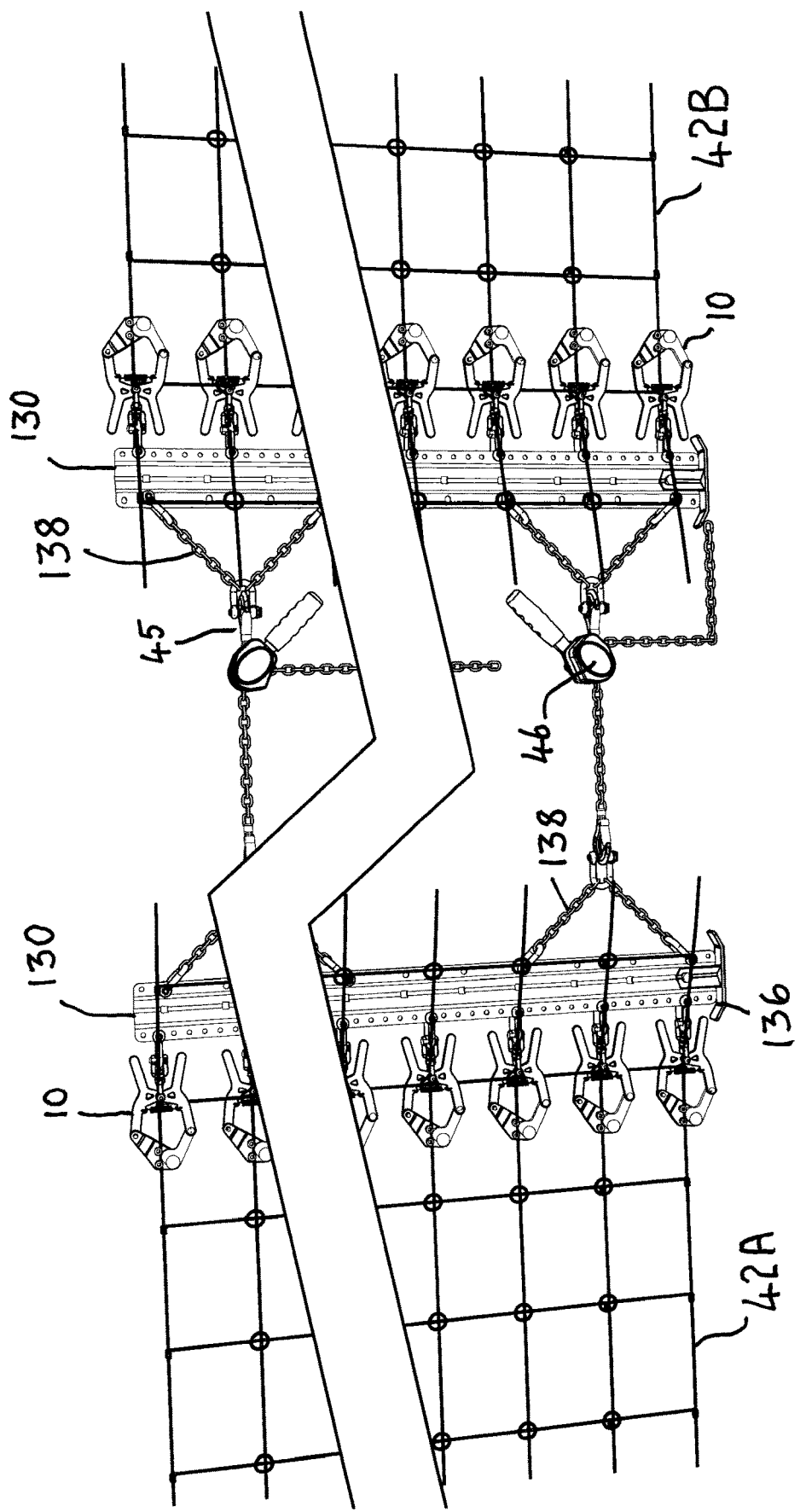
FIG. 7 is a truncated side elevation similar to FIG. 4 but illustrating the tensioning board of FIG. 5.

Turning now to FIGS. 5-7, a tension board 130 of a second embodiment is illustrated. The tension board 130 is formed from a single piece of metal having a cross-sectional shape which has a generally U or V-shaped appearance. On one side of the board 130 are a plurality of closely spaced through apertures 133 which are sized to receive the pin of the pivotal connector 17. On the other side of the board 130 are another plurality of less closely spaced through holes 135 which are sized to receive the connectors of the chains 138 of the wire strainers 45, 46 as seen in FIG. 7. As also illustrated in FIG. 7, two tension boards 130 can be used to simultaneously strain wire netting 42 as before.

Moreover, as illustrated in FIG. 6, if the height of a tension board 130 is less than the height of the netting 42, then a V shaped joiner 140 can be used to interconnect the tension board 130 to a tension board extender 230 utilising bolts 231 and wing nuts 232. Typically a tension board 130 has a length of approximately 1 m so if fence approximately 1500 mm high is being erected, then a tension board 130 and a tension board extender 230 are adequate for a fence of this height. However, if an exclusion fence is being erected which is approximately 2 meters high, then instead of utilising a tension board extender 230, an additional tension board 130 can be used instead.

Preferably the tension board 130 is provided with a skid 136 which is simply bolted to the bottom of the tension board 130.

Where the netting 42 consists of individual horizontal wires, then these wires can be individually clamped to a corresponding wire gripper 10 of the tension boards 30, 130. However, in circumstances where the wire netting is rabbit netting, chicken netting, or aviary netting, for example then grasping by means of a wire gripper 10 is not very practical. In these circumstances, as illustrated in FIGS. 8-11, two of the tension boards 130 can be arranged to clamp the netting 142.

Figure 8:
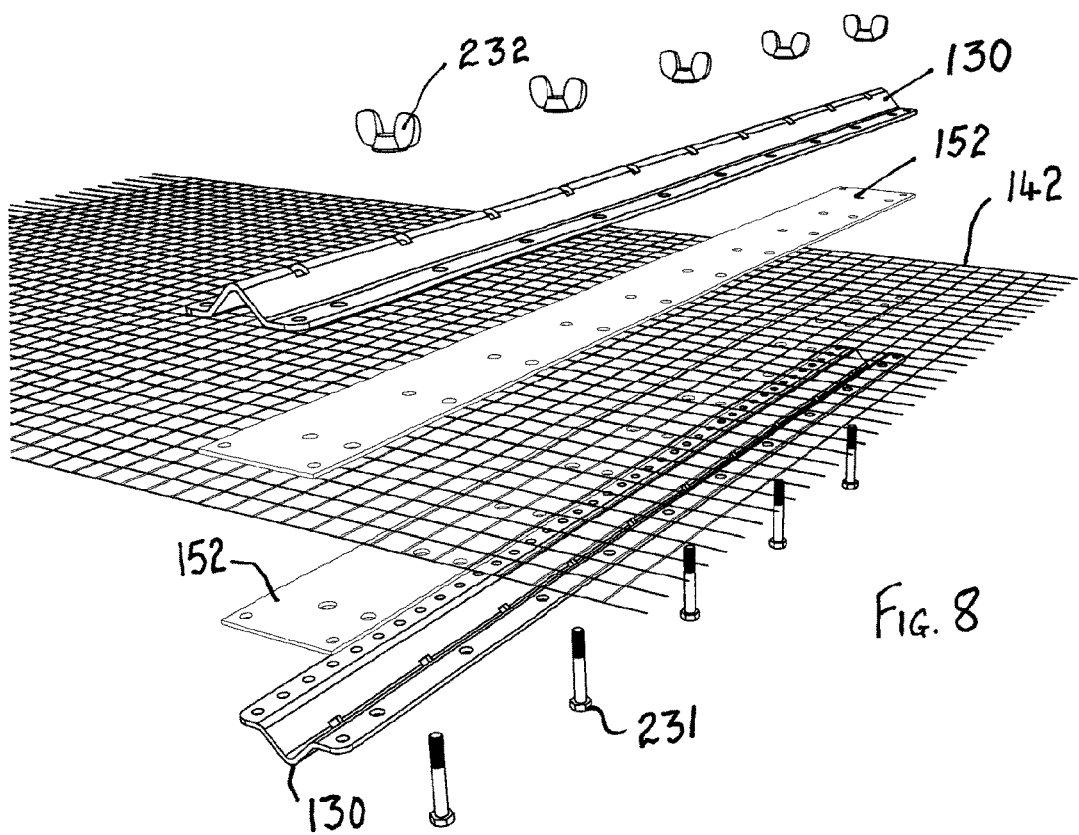
FIG. 8 is an exploded perspective view of a clamping arrangement utilising a tension board of the type illustrated in FIG. 5.
Figure 9:
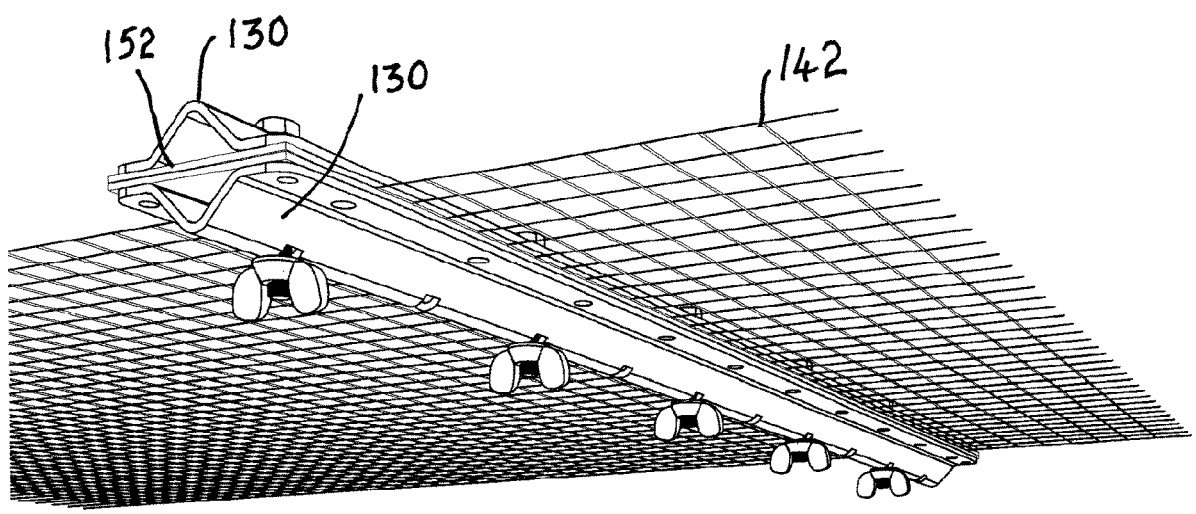
FIG. 9 is a perspective view similar to FIG. 8 and illustrating the clamping action.

In the embodiment illustrated in FIGS. 8 and 9, preferably two flat plates 152 of steel or rubber are interposed between the tension boards 130 so as to prevent the netting 142 being grooved or kinked. This is desirable if the same netting is to be used on different faces of a multi-walled aviary, for example. The tension boards 130 are clamped together by means of bolts 231 and wing nuts 232.

Figure 10:
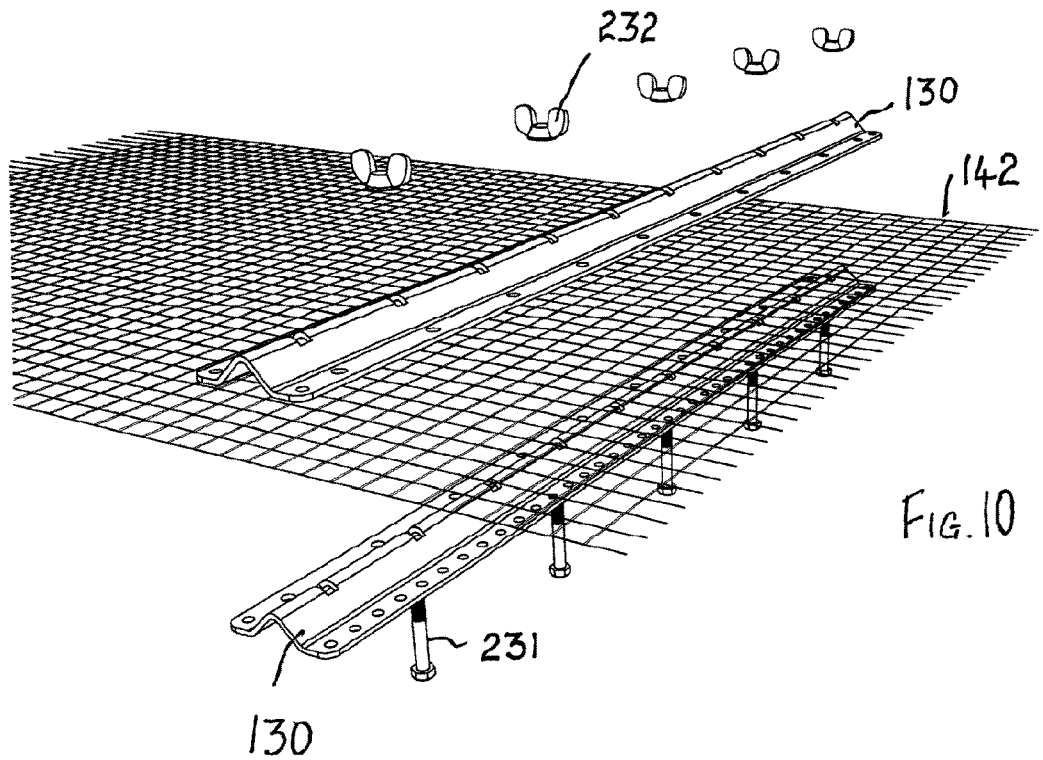
FIG. 10 is a view similar to FIG. 8 but showing an alternative clamping action.
Figure 11:
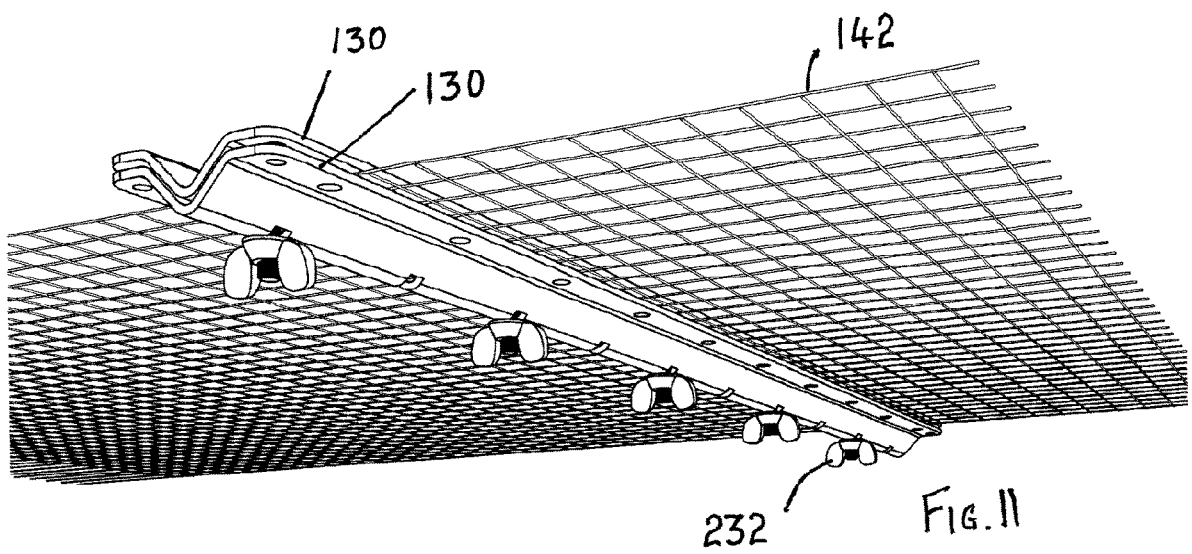
FIG. 11 is an inverted perspective view of the arrangement illustrated in FIG. 10 but showing the clamping action.

However, in the embodiment of FIGS. 10 and 11, the two tension boards 130 are arranged in a nesting configuration which results in a tight grip of the netting 142 but results in a permanent kink or groove being formed in the netting. This is not a problem if the end of strip of netting including the kink or groove is to be discarded as being surplus to requirements.

The foregoing describes only two embodiments of the present invention and modifications, obvious to those skilled in the fencing arts, can be made thereto without departing from the scope of the present invention. For example, each tension board 30 need not be fabricated from rectangular metal tube as illustrated, but can be formed from fence posts such as a pair of conventional star pickets welded longitudinally. In addition, the manufactured length of the tension boards 30 can be adapted to correspond to the height of the roll of netting wire 42. Thus netting wire adapted for exclusion fencing will require tension boards having a length of approximately 2 meters, whereas netting wire for conventional fencing is shorter and thus the tension boards can also be appropriately shorter, and thus less heavy.

In addition, the tension boards can be used in a number of ways other than as illustrated in FIGS. 4 and 7. For example, the netting can be made fast at strainer posts at opposite ends of the fence and two tension boards used in the middle of the fence to strain the netting. This produces a curve or loop of netting between the two tension boards 30 or 130. This loop is then cut out and the cut ends joined before releasing the tension on the tension boards 30 or 130.

Alternatively, a single tension board 30, 130 can be used. In this scenario the roll of netting is made fast at one strainer post at one end of the fence and the tension board 30, 130 located at the other end of the fence. The strainer, for example 45 or 46, is connected to the other strainer post and the netting strained. Whilst the strain is maintained, the loose end of the netting is connected directly to the other strainer post. Thereafter the strainer is loosened from the tension board leaving the desired strained netting.

The term "comprising" (and its grammatical variations) as used herein is used in the inclusive sense of "including" or "having" and not in the exclusive sense of "consisting only of".

The invention claimed is:

1. A tension board for straining net style fencing materials composed of a first plurality of spaced apart substantially horizontal wires and a second plurality of spaced apart substantially vertical wires, said board comprising an elongate member having a longitudinal axis and a longitudinal extent at least corresponding to the distance between the first and last of said horizontal wires, a third plurality of spaced apart apertures extending along said member, and a fourth plurality of wire grippers, the number of said fourth plurality being less than the number of said third plurality, said wire grippers being connected to said elongate member at selected ones of said spaced apart apertures, each of said wire grippers comprising four interconnected arms, one end of the first and second arms being pivoted to each other, one end of the third and fourth arms being pivoted to each other; the other ends of the first and second arms being pivoted to the other ends of the third and fourth arms; one pair of said pivoted arms being shaped to form a wire clamp; a spring extending between an adjacent pair of said arms and arranged to close said wire clamp; and two of said arms having elongate extensions which form handles which, when gripped, open said wire clamp.

2. The board as defined in claim 1 wherein the number of said grippers equals the number of said horizontal wires.

3. The board as defined in claim 2 wherein the spacing between said grippers substantially corresponds to the spacing between said horizontal wires.

4. The board as defined in claim 1 wherein said spring extends between said third and fourth arms.

5. The board as defined in claim 4 wherein
said handles extend from said third and fourth arms.

6. The board as defined in claim 1 and having at least one skid.

7. The board as defined in claim 1 and having a tubular configuration.

8. The board as defined in claim 1 and having a substantially constant cross-sectional shape wherein a one of said boards can mate with another of said boards in either one of two clamping configurations.

9. The board as defined in claim 8 and having a transverse cross-sectional shape which is generally U or V-shaped.

10. The board as defined in claim 1 and joined to a like board by means of a joiner to form a single extended board.

11. A pair of tension boards each of which is as defined in claim 1.

12. A method of using the tension board as claimed in claim 1 to simultaneously straining the horizontal wires of net style fencing material composed of a first plurality of spaced apart substantially horizontal wires and a second plurality of spaced apart substantially vertical wires, said method comprising the steps of, in any order, selecting some of a third plurality of spaced apart apertures in said elongate member having a longitudinal axis and a longitudinal extent at least corresponding to the distance between the first and last of said horizontal wires and locating one of a fourth plurality of said wire grippers at each of said selected apertures, grasping each of said substantially horizontal wires in a corresponding said wire gripper, and, thereafter, moving said elongate member so as to simultaneously increase the tension in said horizontal wires.

13. A method of using a pair of the tension boards as claimed in claim 1 to simultaneously straining the horizontal wires of two rolls of net style fencing material each composed of a first plurality of spaced apart substantially horizontal wires and a second plurality of spaced apart substantially vertical wires, said method comprising the steps of, in any order, selecting some of a third plurality of spaced apart apertures in a first said elongate member having a longitudinal axis and a longitudinal extent at least corresponding to the distance between the first and last of said horizontal wires and locating one of a fourth plurality of first said wire grippers at each of said selected apertures, the spacing between each of said connected
wire grippers corresponding to the spacing between said horizontal wires, selecting some of a third plurality of spaced apart apertures in a second said elongate member having a longitudinal axis and a longitudinal extent at least corresponding to the distance between the first and last of said horizontal wires and locating one of a fourth plurality of second said wire grippers at each of said selected apertures, the spacing between each of said connected wire grippers corresponding to the spacing between said horizontal wires, for each said roll grasping each of said substantially horizontal wires in a corresponding said wire gripper, and, thereafter, moving said first and second elongate members towards each other so as to simultaneously increase the tension in said horizontal wires of both rolls.

\* \* \* \* \*